United States Patent [19]
Chesnoy et al.

[11] Patent Number: 5,944,867
[45] Date of Patent: *Aug. 31, 1999

[54] METHOD OF MANUFACTURING A MULTI-CORE OPTICAL FIBER

[75] Inventors: José Chesnoy, Paris; Jean-Yves Boniort, Limours; André Tardy, Egly; Claude Brehm, Montrouge; Pierre Sansonetti, Palaiseau, all of France

[73] Assignee: Alcatel Fibres Optiques, Bezons Cedex, France

[*] Notice: This patent is subject to a terminal disclaimer.

[21] Appl. No.: 09/026,120

[22] Filed: Feb. 19, 1998

Related U.S. Application Data

[63] Continuation of application No. 08/560,796, Nov. 21, 1995, Pat. No. 5,792,233.

[30] Foreign Application Priority Data

Nov. 24, 1994 [FR] France ................................. 94 14102

[51] Int. Cl.⁶ .................................................. C03B 37/028
[52] U.S. Cl. .............................................. 65/408; 65/411
[58] Field of Search ............................. 65/408, 411, 537

[56] References Cited

U.S. PATENT DOCUMENTS

| | | |
|---|---|---|
| 3,004,368 | 10/1961 | Hicks . |
| 3,119,678 | 1/1964 | Bazinet . |
| 3,198,059 | 8/1965 | Phaneuf . |
| 3,216,807 | 11/1965 | Woodcock . |
| 3,328,143 | 6/1967 | Hicks . |
| 3,455,666 | 7/1969 | Bazinet, Jr. . |
| 3,626,040 | 12/1971 | Nagao . |
| 3,761,234 | 9/1973 | Siegmund . |
| 3,837,824 | 9/1974 | Siegmund . |
| 4,127,398 | 11/1978 | Singer, Jr. . |
| 4,551,162 | 11/1985 | Hicks, Jr. . |
| 4,682,849 | 7/1987 | Kowata . |

FOREIGN PATENT DOCUMENTS

| | | |
|---|---|---|
| 0101742 | 3/1994 | European Pat. Off. . |
| 1601903 | 10/1970 | France . |
| 5762005 | 4/1982 | Japan . |

*Primary Examiner*—John Hoffmann
*Attorney, Agent, or Firm*—Sughrue, Mion, Zinn, Macpeak & Seas, PLLC

[57] ABSTRACT

A method of manufacturing a multi-core optical fiber, the method including assembling together a plurality of substantially identical single-core optical fiber preforms (2', 2"), referred to as "single-core preforms", each of which includes a core bar (3) surrounded by a layer of optical cladding (4), so as to form a "multi-core preform" (10) and drawing down the multi-core preform (10) so as to obtain the multi-core optical fiber. The assembly step includes securing the single-core preforms (2', 2") to one another by fusing them over their entire lengths or over portions thereof along their tangential lines of contact (T), without inserting the multi-core preform (10) into a holding tube. A vacuum is maintained in the preform during the drawing step, the vacuum being formed before or during the drawing step.

10 Claims, 2 Drawing Sheets

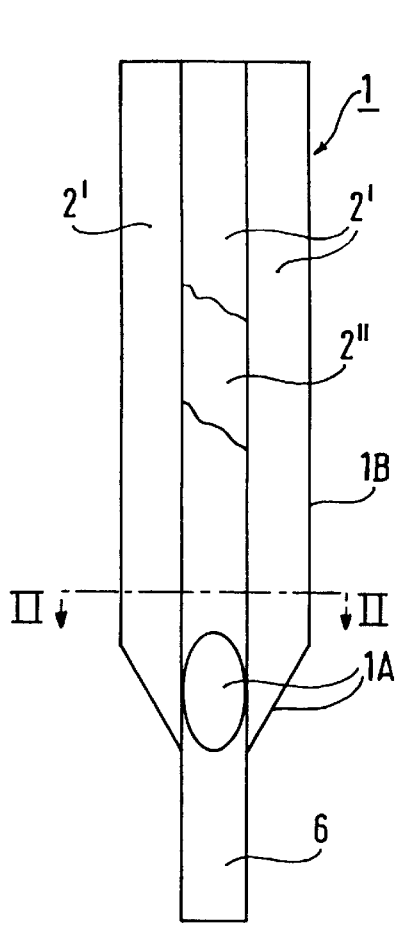
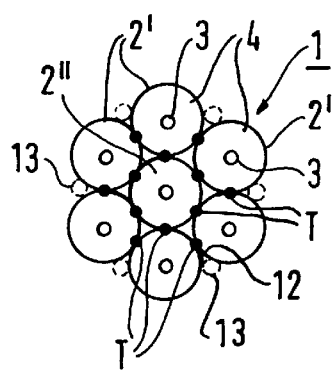
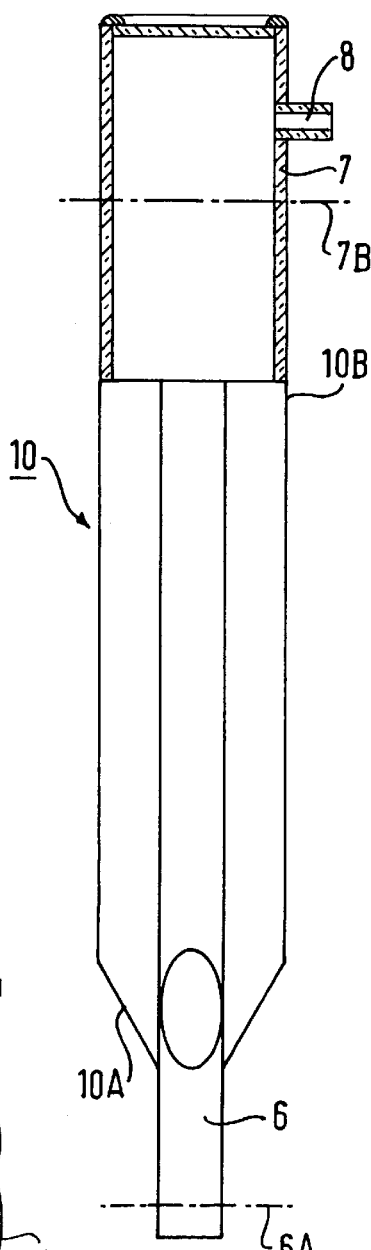
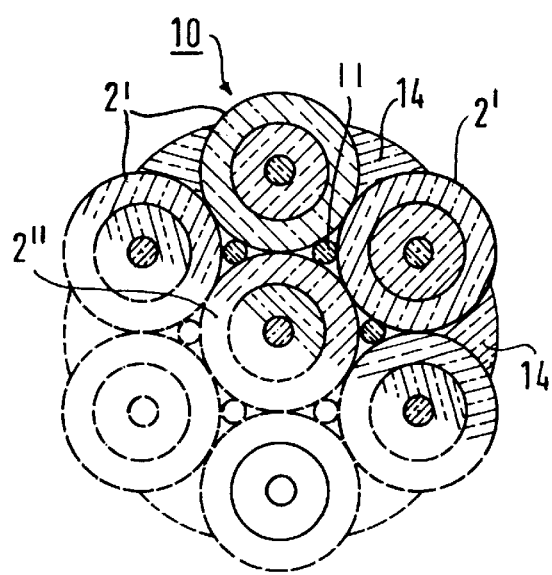
FIG.1  FIG.2  FIG.3
FIG.4

METHOD OF MANUFACTURING A MULTI-CORE OPTICAL FIBER

This is a continuation of application Ser. No. 08/560,796 filed Nov. 21, 1995 now U.S. Pat. No. 5,792,233.

BACKGROUND OF THE INVENTION

1. Field of the Invention

The present invention relates to a method of manufacturing a multi-core optical fiber, as well-as to a multi-core preform and a multi-core optical fiber obtained by performing the method.

2. Related Art

The term "multi-core optical fiber" refers to an optical fiber comprising a plurality of mutually parallel optical cores embedded in common optical cladding, the majority of the light rays conveyed by such a multi-core optical fiber being guided along its cores. Conventionally, each core of the multi-core fiber has a diameter of a few microns (in general, in the range 7 $\mu$m to 10 $\mu$m), and is disposed, for example, on a circle of radius approximately equal to 40 $\mu$m inside the optical cladding, which cladding has a standard outside diameter of 125 $\mu$m.

In order to provide the desired guiding properties, the optical cores are, in general, made of material based on silica that is doped so as to make its refractive index higher than that of pure silica, while the cladding is made of a material based on silica that is substantially pure, or that is slightly doped so as to make its refractive index lower than that of the core.

One of the main requirements when making multi-core optical fibers is that the cores must be positioned accurately relative to one another. Such accurate positioning makes it possible to effect reliable connections, and to avoid interference between the signals conveyed by the various cores (cross-talk). In particular, the various cores must be spaced apart by a minimum amount. Spacing of about 40 $\mu$m is considered to be the lower limit below which cross-talk is no longer acceptable.

One of the methods currently being considered for manufacturing a multi-core optical fiber is described in Document EP-0 101 742. It consists in inserting into a glass tube a plurality of single-core optical fiber preforms, referred to as "single-core preforms", each of which comprises a core bar surrounded by a layer of cladding, so as to form a multi-core preform.

The multi-core preform is then mounted on a fiber-drawing installation, and it is drawn in the same way as a single-core fiber preform is drawn, at a temperature of about 2,000° C., while the air present in the interstices inside the tube, between said tube and the single-core preforms is evacuated via the top of the multi-core preform. In this way, the desired multi-core fiber is obtained.

That method is not satisfactory because the positioning of the single-core preforms inside the tube is not accurate, so that, in the resulting multi-core fiber, the cores are not positioned accurately relative to one another. Thus, for a multi-core fiber having 7 cores (one core in the center, and six peripheral cores), the core positioning error is approximately +2k$\Delta$R, where $\Delta$R is the difference between the real diameter and the nominal diameter of the single-core preforms, and k is the drawing ratio. Conventionally, where $\Delta$R is equal to 0.33 mm and k is equal to $5.10^{-3}$, the core positioning error is approximately ±3 $\mu$m.

Another problem related to that method results from the use of a tube surrounding the set of single-core fibers. The tube increases the outside diameter of the multi-core preform. Since the multi-core fiber obtained by drawing down the multi-core preform must have a standard outside diameter of 125 $\mu$m, the tube results in spacing between the cores in the multi-core fiber that is less than the minimum required spacing, and this increases cross-talk problems.

SUMMARY OF THE INVENTION

An object of the invention is to remedy those problems by providing a method of manufacturing a multi-core optical fiber, which method makes it possible to have the cores positioned accurately relative to one another and to obtain the minimum required spacing therebetween.

To this end, the present invention provides a method of manufacturing a multi-core optical fiber, the method including the following steps:

assembling together a plurality of substantially identical single-core optical fiber preforms, referred to as "single-core preforms", each of which comprises a core bar surrounded by a layer of optical cladding, so as to form a "multi-core preform"; and drawing down said multi-core preform so as to obtain said multi-core optical fiber;

said method being characterized in that the assembly step consists in securing said single-core preforms to one another by fusing them over their entire lengths or over portions thereof along their tangential lines of contact, without inserting said multi-core preform into a holding tube.

By securing said single-core preforms to one another in this way, it is possible to control the positioning of the single-core preforms relative to one another, and in particular, to control the positions of the axes of each of the single-core preforms relative to the axis of symmetry of the multi-core preform, so that the core positioning accuracy of the multi-core fiber is considerably better than in the prior art. The positioning error with the method of the invention is approximately +k$\Delta$R, i.e. in the numerical example given with respect to the prior art, ±1.5 $\mu$m. Thus, by means of the invention, it is possible to halve the positioning error of the cores in the multi-core fiber.

In addition, securing the single-core preforms to one another makes it unnecessary to use a holding tube, and therefore makes it possible for the required minimum spacing between the cores to be obtained in the drawn fiber, thereby avoiding cross-talk problems.

Advantageously, prior to being secured to one another, the single-core preforms are polished so as to adjust the centering of their cores. This further improves core positioning accuracy.

In an improved implementation, said multi-core preform is evacuated prior to being drawn, the evacuated preform being sealed off so as to maintain the vacuum during drawing.

Very advantageously, the multi-core preform may include a plurality of "outer" rods made of a vitreous material, each of said outer rods being fused between two adjacent single-core preforms situated at the periphery of the multi-core preform, so as to form bridges between the peripheral single-core preforms.

The diameter of the outer rods may be such that the diameter of the circumscribed circle of the multi-core preform does not exceed that of the circumscribed circle of the assembled-together single-core preforms.

Also advantageously, "inner" rods made of a vitreous material may be inserted into the interstices left empty between the single-core preforms.

A piece of glass serving as a drawing leader may extend one end of the multi-core preform. The leader may be constituted by a piece of glass secured to the end of the multi-core preform, or by an extension to one of the single-core preforms belonging to the multi-core preform.

BRIEF DESCRIPTION OF THE DRAWING FIGURES

Other characteristics and advantages of the present invention appear from the following description of an implementation of the method of the invention, given by way of non-limiting example and with reference to the accompanying drawings, in which:

FIG. 1 is a side view of an assembly comprising single-core preforms secured together according to the invention;

FIG. 2 is a section on line II—II of FIG. 1.

FIG. 3 is a side view of a multi-core preform of the invention ready to be drawn down;

FIG. 4 is a cross-section view of a variant multi-core preform of the invention.

DESCRIPTION OF THE PREFERRED EMBODIMENTS

Figure 5:
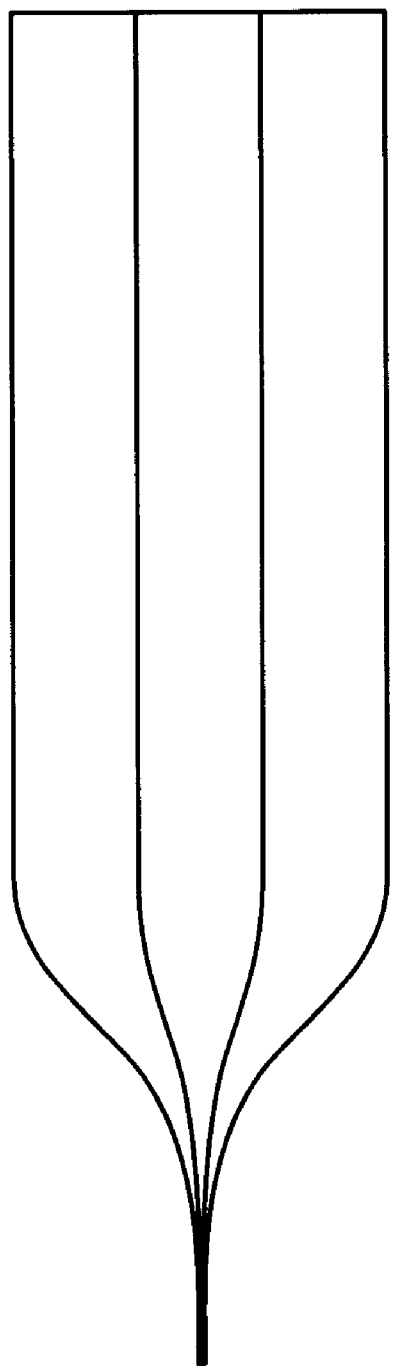
FIG. 5 illustrates the drawing process.

In all of the figures, common elements are given the same references.

FIGS. 1 and 2 show an assembly 1 comprising seven assembled-together single-core preforms, in which assembly six "outer" preforms 2' surround a "central" preform 2". Each single-core preform 2', 2", e.g. obtained by performing modified chemical vapor deposition (MCVD), may, for example, be composed of a core bar 3, e.g. made of germanium-doped silica and having a diameter of 1.4 mm, surrounded by a layer of optical cladding 4, e.g. made of silica doped with fluorine so as to make its refractive index lower than that of the core bar 3. The diameter of each of the single-core preforms 2', 2" is 8 mm, and the length of each of them is at least 200 mm. The central preform 2" may be longer than the outer preforms 2' (e.g. it may have a length of 400 mm) so as to facilitate assembling them together, and so as to serve as a drawing leader (its end serving as a drawing leader is referenced 6 in FIG. 3).

The cores 3 of the single-core preforms 2', 2" constitute the cores of the multi-core fiber to be manufactured.

In order to facilitate subsequent drawing, one of the ends of each of the outer preforms 2' may be bevelled so that one end 1A of the assembly 1 is frustoconical in shape (see FIG. 1).

According to the invention, the six outer preforms 2' are secured to one another and to the central preform 2" by being fused, i.e. by being locally fused along portions of their tangential lines of contact T which are diagrammatically represented by respective dots in FIG. 2. For example, the fusion may be effected by means of a blowtorch or of a $CO_2$ laser (not shown) that moves along the tangential lines of contact T. In order to hold the preforms 2', 2" while they are being fused, it is possible, for example, to use a clamping chuck having three jaws (not shown), in which chuck each jaw has a V-shaped gripping portion.

The single-core preforms do not need to be secured to one another over the entire length of the assembly 1. For example, they may be secured together at the ends 1A and 1B of the assembly only.

By securing the preforms 2', 2" to one another, it is possible to ensure that they are accurately positioned relative to one another, by setting and checking the relative positions of the preforms 2', 2" prior to fusing. Such accurate positioning is simple to perform.

The resulting assembly 1 is referred to as a "multi-core preform", and it is referenced 10.

In order to ensure that the interstices left empty between the preforms 2' and 2" close properly during the subsequent drawing operation, so as to obtain a multi-core fiber that is compact and uniform, the interstices between the preforms 2' and 2" may be evacuated prior to drawing. To do this, a tube 7 is secured in gastight manner to one of the ends 10B of the preform 10, which tube is blind, i.e. it is closed off at its top end which is opposite from its end connected to the preform 10, and open to one side via a side tube 8 for connecting it to pumping means (not shown).

By connecting the pumping means to the side tube 8, a primary vacuum, close to 1 Pa is formed inside the preform 10, and the tube 8 is then sealed off (e.g. by means of a blow-torch) so as to maintain the vacuum in the preform 10.

Alternatively, it is possible to evacuate the preform 10 while it is being drawn. To do this, the pumping means are connected to the tube 8 while the preform is being drawn.

The assembly shown in FIG. 3 and comprising the multi-core preform 10, the leader 6, and the blind tube 7 can then be directly used in a fiber-drawing installation (not shown). It may be held therein by means of chucks (not shown) at a bottom section 6A belonging to the leader 6, and at a top section 7B belonging to the blind tube 7.

The preform is drawn down by a conventional drawing machine as shown in FIG. 5; conventionally, with the drawing temperature being, for example, in the vicinity of 2,000° C., by drawing the bottom end 10A of the multi-core preform 10 until a multi-core fiber 100 (FIG. 5) having the desired dimensions is obtained. See FIG. 5 which illustrates the drawing process.

In a very advantageous improved implementation of the invention, in order to provide good cohesion and good airtightness for the multi-core preform 10, an "outer" rod 13 (shown in dashed lines in FIG. 2) made of a vitreous material and of length in the vicinity of that of the single-core preforms 2', 2" may be disposed at the bottom of each curved V-shape 12 (see FIG. 2) defined between two adjacent outer preforms 2' of the multi-core preform 10, and the rods 13 may then be fused to the preforms 2' by being heated, so as to form bridges 14 between the peripheral preforms 2' (see FIG. 4). In this way, the outer rods 13 perform the holding function that is performed by the holding tube in the prior art, without giving rise to the problem related to that tube, namely a reduction in the spacing between the cores of the multi-core fiber, because the rods 13 can be chosen so that the diameter of the circumscribed circle of the multi-core preform 10 remains the same as that of the circumscribed circle of the set of assembled-together preforms 2'.

In a possible improved implementation, in order to reduce the volume left empty inside the preform 10 between the preforms 2', 2", the interstices left empty therebetween may be filled with inner filler rods 11 made of a vitreous material, as shown in FIG. 4.

The method of the invention makes it possible to position the single-core preforms relative to one another better than the prior art method consisting merely in disposing the single-core preforms in a tube.

Furthermore, to facilitate locating the cores of the resulting multi-core optical fiber, marking may be effected by inserting a filler rod that is, for example, colored.

Naturally, the present invention is not limited to the above-described implementation.

In particular, the number of single-core preforms making up the multi-core preform, and the dimensions of said single-core preforms are given merely by way of example, and said number and dimensions may be adapted to the characteristics of the desired multi-core fiber. In particular, a multi-core fiber having 3 or 4 cores may be manufactured according to the invention by starting with a multi-core preform comprising 3 or 4 single-core preforms. It is also possible, according to the invention, to manufacture a multi-core preform from n peripheral preforms disposed around a central bar that is made of a vitreous material and that is not necessarily a single-core preform. In which case the diameter $\phi$ of the central bar made of a vitreous material is given by the following formula:

$$\phi = \phi_p (1/\sin(\pi/n) - 1)$$

where $\phi_p$ is the outside diameter of the single-core preforms.

In order to hold the single-core preforms together while they are being fused, the single-core preforms may be pre-secured to one another at their ends by means of additional silica, instead of using clamping jaws.

If the tolerances on the outside diameter of the single-core preforms are not too tight, i.e. if the error on their diameter is greater than a tenth of a millimeter, it is possible to position the single-core preforms accurately relative to one another by means of a hole gauge, with the holes corresponding to the cores of the single-core preforms, the gauge being placed at the end of the assembly so that the cores of the single-core preforms are caused to coincide with the holes in the gauge, and inner rods then being inserted to take up the resulting clearance between the single-core preforms. The remainder of the method takes place as described above. When the tolerances on the outside diameter of the single-core preforms are tight, assembling them together compactly suffices to obtain the required positioning.

Furthermore, the inner rods may be secured by being fused to the single-core preforms. In which case, assembly must be effected in stages, i.e. the inner rods must be fused firstly with the inner preforms, and then secondly with the peripheral preforms.

That end of the central single-core preform which serves as the drawing leader may be replaced with a drawing leader in the form of a separate tube or bar fused to the end of the central single-core preform.

Finally, any means may be replaced by equivalent means without going beyond the ambit of the invention.

We claim:

1. A method of manufacturing a multi-core optical fiber, comprising steps of:

assembling together a plurality of single-core optical fiber preforms, each comprising a core surrounded by a layer of optical cladding, so as to form a multi-core preform; and drawing down said multi-core preform to obtain said multi-core optical fiber, wherein said assembling step comprises securing said single-core preforms to each other by fusing them over their entire lengths or over portions thereof along tangential lines of contact, without inserting said multi-core preform into a tube, wherein said method further comprises maintaining a vacuum in the multi-core preform during said drawing step, the vacuum being formed before or during said drawing step, and wherein said multi-core preform comprises a plurality of outer rods which are made of a vitreous material and have a different structure as compared to said single-core preforms, said method further comprising fusing each of the outer rods between adjacent ones of the single-core preforms at an outer periphery of the multi-core preform in order to form bridges between peripheral ones of the single core-preforms.

2. A method as recited in claim 1, wherein a positioning error in said assembling step is equal to $+k\Delta R$, where k is a drawing ratio and $\Delta R$ is the difference between a real diameter and a nominal diameter of the single-core preforms.

3. A method as recited in claim 1, wherein the vacuum is maintained at a pressure of about 1 Pa.

4. A method of manufacturing a multi-core optical fiber, comprising steps of:

assembling together a plurality of single-core optical fiber preforms, each comprising a core surrounded by a layer of optical cladding, so as to form a multi-core preform; and drawing down said multi-core preform to obtain said multi-core optical fiber, wherein said assembling step comprises securing said single-core preforms to each other by fusing them over their entire lengths or over portions thereof along tangential lines of contact, without inserting said multi-core preform into a tube, wherein said method further comprises maintaining a vacuum in the multi-core preform during said drawing step, the vacuum being formed before or during said drawing step, and wherein said assembling step comprises forming a drawing leader extending from one end of the multi-core preform, wherein said drawing step comprises pulling the drawing leader.

5. A method according to claim 4, wherein said drawing leader is a piece of glass.

6. A method according to claim 4, wherein said drawing leader is a portion of one of said single-core optical preforms that extends beyond the ends of all of the other single-core optical preforms.

7. A method as recited in claim 4, wherein, in said assembling step, n number of the single-core preforms are arranged peripherally around a central bar made of a vitreous material, and a diameter $\phi$ of the central bar is calculated according to the following equation:

$$\phi = \phi_p (1/\sin(\pi/n) - 1)$$

where $\phi_p$ is the outside diameter of the single-core preforms.

8. A method of manufacturing a multi-core optical fiber, comprising steps of:

assembling together a plurality of single-core optical fiber preforms, each comprising a core surrounded by a layer of optical cladding, so as to form a multi-core preform; and drawing down said multi-core preform to obtain said multi-core optical fiber, wherein said assembling step comprises securing said single-core preforms to each other by fusing them over their entire lengths or over portions thereof along tangential lines of contact, without inserting said multi-core preform into a tube, wherein said method further comprises maintaining a vacuum in the multi-core preform during said drawing step, the vacuum being formed before or during said drawing step, and prior to said drawing step, machining an end of at least one of the single-core optical fiber preforms to form a bevel.

9. A method as recited in claim 8, wherein said multi-core preform is drawn at 2,000° C. in said drawing step.

10. A method of manufacturing a multi-core optical fiber, comprising steps of:

assembling together a plurality of single-core optical fiber preforms, each comprising a core surrounded by a layer of optical cladding, so as to form a multi-core preform; and drawing down said multi-core preform to obtain said multi-core optical fiber, wherein said assembling step comprises securing said single-core preforms to each other by fusing them over their entire lengths or over portions thereof along tangential lines of contact, without inserting said multi-core preform into a tube, wherein said method further comprises maintaining a vacuum in the multi-core preform during said drawing step, the vacuum being formed before or during said drawing step.

* * * * *